US011858272B2

(12) United States Patent

Chang et al.

(10) Patent No.: US 11,858,272 B2

(45) Date of Patent: Jan. 2, 2024

(54) INK CIRCULATION SYSTEM

(71) Applicant: Kinpo Electronics, Inc., New Taipei (TW)

(72) Inventors: Po-Chih Chang, New Taipei (TW); Pei-Chi Ho, New Taipei (TW); Ya-Ching Tung, New Taipei (TW); Chi-Kuang Shen, New Taipei (TW); Shou-Chih Sun, New Taipei (TW); Yao-Te Huang, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 59 days.

(21) Appl. No.: 17/674,846

(22) Filed: Feb. 18, 2022

(65) Prior Publication Data

US 2023/0173815 A1 Jun. 8, 2023

(30) Foreign Application Priority Data

Dec. 2, 2021 (CN) ......................... 202111463216.8

(51) Int. Cl.
*B41J 2/175* (2006.01)
*B41J 2/19* (2006.01)

(52) U.S. Cl.
CPC ....... *B41J 2/17513* (2013.01); *B41J 2/17553* (2013.01); *B41J 2/19* (2013.01)

(58) Field of Classification Search
CPC ....... B41J 2/17513; B41J 2/17553; B41J 2/19
USPC ........................................................... 347/86
See application file for complete search history.

(56) References Cited

U.S. PATENT DOCUMENTS 7,828,425 B2 11/2010 Kang et al.
2003/0128256 A1* 7/2003 Oda ..................... B41J 2/17513 347/85
2006/0284948 A1* 12/2006 Ikeda ......................... B41J 2/19 347/92
2007/0252860 A1* 11/2007 Nitta .................... B41J 2/17509 347/14
2008/0309740 A1* 12/2008 Aldrich .................. B41J 2/1752 347/86
2012/0200622 A1* 8/2012 Inoue ......................... B41J 2/18 347/90
2019/0105918 A1* 4/2019 Cholewik .................. B41J 2/19

FOREIGN PATENT DOCUMENTS

CN 101115623 1/2008

* cited by examiner

*Primary Examiner* — Matthew Luu
*Assistant Examiner* — Alexander D Shenderov
(74) *Attorney, Agent, or Firm* — JCIPRNET

(57) ABSTRACT

An ink circulation system, including an ink cartridge, an ink tank, an ink pump, first, second, and third valves, a print head, a heating assembly, and a positive-negative pressure assembly, is provided. The ink cartridge has an output pipeline and an ink cartridge valve. The ink tank is disposed on one side of the ink cartridge and connected to the output pipeline. The ink pump is connected to the output pipeline and the ink tank through an ink pipeline. The first valve is connected to the ink tank through a first pipeline. The second valve is disposed on the output pipeline. The third valve is connected to the output pipeline and the ink pipeline through a return pipeline. The print head is connected to the ink tank and the return pipeline. The heating assembly is disposed in the ink tank. The positive-negative pressure assembly is connected to the first pipeline.

13 Claims, 9 Drawing Sheets

100

INK CIRCULATION SYSTEM

CROSS-REFERENCE TO RELATED APPLICATION

This application claims the priority benefit of China application serial no. 202111463216.8, filed on Dec. 2, 2021. The entirety of the above-mentioned patent application is hereby incorporated by reference herein and made a part of this specification.

BACKGROUND

Technical Field

The invention relates to an ink circulation system, and particularly relates to an ink circulation system applied to a printer.

Description of Related Art

The existing printers are used to output text messages or image messages digitally stored on paper, transparent films, billboards, or other plane media. The types of existing printers include impact printers, laser printers, and inkjet printers. The inkjet printers are the present mainstream, and the principle of ink jetting is as follows. The ink is sprayed from different ink cartridges to the same place on the plane medium through the piezoelectric measure or the thermal spray measure to form ink droplets, and the combination of a plenty of ink droplets forms a specific pattern, image, or text. In short, when the nozzle of the printer quickly scans the printer paper, the nozzle sprays countless tiny ink droplets to form pixels of the text messages or the image messages.

However, the existing inkjet printers use the ink with viscosity. The ink may become dry and stick to the nozzle when not been used for a long time, which easily results in clogging of the nozzle and being unable to jet ink. Alternatively, the outside air comes into the ink and forms bubbles when the inkjet printers are printing, thereby influencing the quality of printing.

Therefore, developing an ink circulation system which can exclude situations such as the nozzle being clogged by ink and bubbles forming in ink becomes an important development goal.

SUMMARY

The invention provides an ink circulation system, which can effectively exclude situations such as a printer head being clogged or having bubbles in the printer head, and improve poor fluidity of ink.

An ink circulation system of the invention includes an ink cartridge, an ink tank, an ink pump, a first valve, a second valve, a third valve, a printer head, a heating assembly, and a positive-negative pressure assembly. The ink cartridge has an output pipeline and an ink cartridge valve, and the ink cartridge valve is disposed on the output pipeline. The ink tank is disposed on one side of the ink cartridge and is connected to the output pipeline of the ink cartridge. The ink pump is connected to the output pipeline and the ink tank through an ink pipeline. The first valve is connected to the ink tank through a first pipeline. The second valve is disposed on the output pipeline. The third valve is connected to the output pipeline and the ink pipeline through a return pipeline. The printer head is connected to the ink tank and the return pipeline. The heating assembly is disposed in the ink tank. The positive-negative pressure assembly is connected to the first pipeline through a gas pressure pipeline. The ink pump is used to extract ink from the ink cartridge and fill the ink into the ink tank along the output pipeline and the ink pipeline. The positive-negative pressure assembly provides a positive pressure or a negative pressure to the ink tank to squeeze or absorb the ink in the ink tank.

In an embodiment of the invention, when the ink circulation system is in an ink filling mode, an ink volume of the ink cartridge is detected, the first valve and the ink cartridge valve are opened and the second valve is closed, the ink pump is activated to fill the ink into the ink tank along the output pipeline and the ink pipeline, the positive-negative pressure assembly provides the negative pressure to the ink tank, and closes the ink cartridge valve and opens the second valve, the ink pump is then closed, and after sensing that an ink level of the ink tank meets a standard, the heating assembly is activated to heat the ink in the ink tank and the printer head.

In an embodiment of the invention, when the ink circulation system is in a loop printing mode, the positive-negative pressure assembly is activated to provide the negative pressure, the first valve is opened, and after sensing that an ink level of the ink tank meets a standard, the ink cartridge valve is closed and the second valve is opened, the ink pump is activated to fill the ink into the printer head, the heating assembly heats the ink in the ink tank and the printer head, and the printer head starts printing.

In an embodiment of the invention, when the ink circulation system is in an ink removal mode, after sensing that an ink level of the ink tank meets a standard, the ink cartridge valve and the first valve are closed and the second valve is opened, the positive-negative assembly stops providing the negative pressure and opens the first valve, the ink pump is activated to fill the ink into the ink tank along the output pipeline and the ink pipeline, and the positive-negative pressure assembly provides the positive pressure to the ink tank to squeeze the ink to be transmitted to the printer head.

In an embodiment of the invention, when the ink circulation system is in a bubble removal mode, after sensing that an ink level of the ink tank meets a standard, the ink cartridge valve and the first valve are closed and the second valve is opened, and after the positive-negative assembly stops providing the negative pressure, the first valve and the third valve are opened and the second valve is closed, the ink pump is activated to fill the ink into the ink tank along the output pipeline and the ink pipeline, and the positive-negative pressure assembly provides the positive pressure to the ink tank to squeeze the ink to pass through the printer head and the third valve.

In an embodiment of the invention, the ink circulation system further includes a pressure sensor disposed on a gas pressure pipeline and used to detect a gas pressure value between the ink tank and the printer head.

In an embodiment of the invention, when the gas pressure value of the ink tank declines to a default value, the printer head is released from a clogged state.

In an embodiment of the invention, the ink tank further has multiple level sensors disposed on an outer surface of the ink tank and used to detect the ink level in the ink tank.

In an embodiment of the invention, the positive-negative pressure assembly has a positive pressure pump, a negative pressure pump, and a gas pressure valve. The positive pressure pump and the negative pressure pump are respectively connected to the gas pressure pipeline, and the gas pressure valve is disposed between the gas pressure pipeline and the first pipeline. The gas pressure valve is used to switch the first pipeline to be connected to the positive pressure pump or the negative pressure pump.

In an embodiment of invention, the ink circulation system further includes a weight sensor disposed at a bottom of the ink cartridge and used to detect an ink volume of the ink cartridge.

In an embodiment of the invention, the ink tank and the ink cartridge are made of metal materials.

In an embodiment of the invention, the output pipeline, the ink pipeline, the return pipeline, and the first pipeline are made of teflon.

Based on the above, the ink pump of the ink circulation system of the invention is used to extract the ink from the ink cartridge and fill the ink into the ink tank along the output pipeline and the ink pipeline to achieve the purpose of replenishing the ink. Further, the negative pressure may be provided to the ink tank through the positive-negative pressure assembly to absorb the ink in the ink tank, thereby preventing the ink from leaking from the printer head. The positive-negative pressure assembly is suitable for providing the positive pressure to the ink tank to squeeze the ink in the ink tank, so that the ink is transmitted to the printer head to release the printer head from the clogged situation or remove the bubbles from the printer head by enabling the ink to pass through the printer head. In addition, the heating assembly of the invention is suitable for heating the ink in the ink tank and the printer head to reduce the viscosity of the ink, thereby improving the fluidity of the ink and reducing the clogging of the printer head by the ink.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
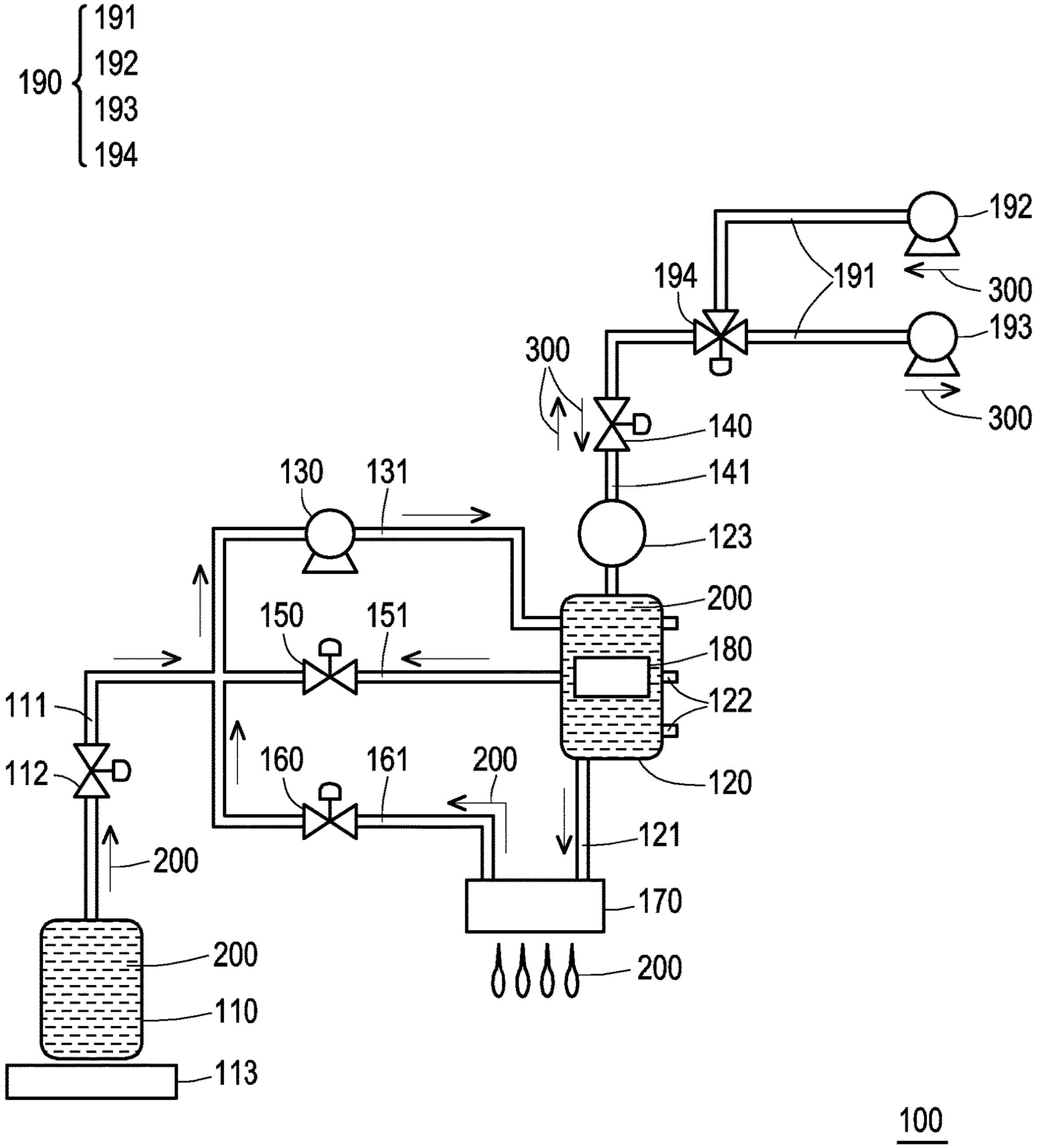
FIG. 1 is a structural schematic diagram of an ink circulation system according to an embodiment of the invention.

Referring to the exemplary embodiments of the invention in detail, the examples of the exemplary embodiments of the invention are described in the accompanying drawings. Whenever possible, the same reference numerals are used in the drawings and descriptions to indicate the same or similar parts.

Referring to FIG. 1, an ink circulation system 100 of the invention is suitable for an inkjet printer. The inkjet printer accurately sprays tiny ink droplets on a paper, a transparent film, a billboard, or a similar plane medium to be printed through a printer head to form texts and patterns on the plane medium. The ink circulation system 100 of the invention is not limited to ink with one color. By combining multiple sets of the ink circulation systems 100, ink with multiple colors may be output in the inkjet printer, thereby being mixed to form color effects.

Referring to FIG. 1, the ink circulation system 100 of the invention includes an ink cartridge 110, an ink tank 120, an ink pump 130, a first valve 140, a second valve 150, a third valve 160, a printer head 170, a heating assembly 180, and a positive-negative pressure assembly 190.

The ink cartridge 110 is used to store an ink 200 and has an output pipeline 111 and an ink cartridge valve 112. The ink cartridge valve 112 is disposed on the output pipeline 111 and is suitable for controlling whether the ink of the ink cartridge 110 can flow into the output pipeline 111. The ink tank 120 is disposed on one side of the ink cartridge 110 and is connected to the output pipeline 111 of the ink cartridge 110. The ink tank 120 serves as a relay node of the ink 200 and provides a gas pressure to stabilize the ink 200 to facilitate the storage and output of the ink 200. The ink pump 130 is connected to the output pipeline 111 and the ink tank 120 through an ink pipeline 131. The first valve 140 is connected to the ink tank 120 through a first pipeline 141. The second valve 150 is disposed on the output pipeline 111 and is arranged side by side with the ink pump 130. The second valve 150 is used to control the formation of a closed circuit or an open circuit between the output pipeline 111 and the ink tank 120. The third valve 160 is connected to the output pipeline 111 and the ink pipeline 131 through a return pipeline 161. The printer head 170 is connected to an ink tank pipeline 121 of the ink tank 120 and the return pipeline 161. The heating assembly 180 is disposed in the ink tank 120. The heating assembly 180 is disposed in the ink tank 120. The heating assembly 180 is used to heat the ink 200 of the ink tank 120 to reduce the viscosity of the ink 200, thereby improving the fluidity of the ink 200 and preventing the viscosity of the ink 200 from increasing due to low temperature, which causes the ink to be clogged in the ink tank 120 and the printer head 170. The positive-negative pressure assembly 190 is connected to the first pipeline 141 through a gas pressure pipeline 191.

Further, the ink pump 130 is used to extract the ink 200 from the ink cartridge 110 and fill the ink 200 into the ink tank 120 along the output pipeline 111 and the ink pipeline 131. The positive-negative pressure assembly 190 provides a positive pressure or a negative pressure to the ink tank 120 to squeeze or absorb the ink 200 in the ink tank 120.

Referring to FIG. 1, in the embodiment, the positive-negative pressure assembly 190 has a positive pressure pump 192, a negative pressure pump 193, and a gas pressure valve 194. The positive pressure pump 192 and the negative pressure pump 193 are respectively connected to the gas pressure pipeline 191, and the gas pressure valve 194 is disposed between the gas pressure pipeline 191 and the first pipeline 141. The gas pressure valve 194 is used to switch the first pipeline 141 to be connected to the positive pressure pump 192 or the negative pressure pump 193 and provide a stable positive pressure/negative pressure. The positive pressure pump 192 and the negative pressure pump 193 may also adjust a pressure range of the positive-negative pressure.

In addition, providing the positive pressure represents that the positive pressure pump 192 extracts an air 300 from the outside and transmits the air 300 from the gas pressure pipeline 191 and the first pipeline 141 to the ink tank 120, thereby squeezing the ink 200 in the ink tank 120, so that the ink 200 is transmitted to the printer head 170 through the ink tank pipeline 121. Providing the negative pressure represents that the negative pressure pump 193 extracts the air 300 in the ink tank 120 and discharges the air 300 from the first pipeline 141 and the gas pressure pipeline 191 to the outside, so that the ink tank 120, the first pipeline 141, and the gas pressure pipeline 191 form a vacuum, thereby adsorbing the ink 200 in the ink tank 120 and preventing the ink 200 from leaking from the printer head 170.

In other embodiments, when combining multiple sets of the ink circulation systems 100, the single positive-negative pressure assembly 190 can provide the positive-negative pressure to multiple sets of the ink circulation systems 100 without adopting multiple positive-negative pressure assemblies 190.

Referring to FIG. 1, the ink cartridge 110 includes a weight sensor 113, which is disposed at a bottom of the ink cartridge 110 and is used to detect an ink volume of the ink cartridge. The weight sensor 113 determines whether an ink reserve of the ink cartridge 110 is sufficient through weight detection. If a weight of the ink cartridge 110 is lower than a default value, the ink reserve of the ink cartridge is insufficient, and a notification is issued to remind the user to replace the ink cartridge 110 with a new one.

Referring to FIG. 1, the ink tank 120 also has multiple level sensors 122. The level sensors 122 are disposed on an outer surface of the ink tank 120 and are used to detect an ink level of the ink tank 120, thereby identifying the ink reserve in the ink tank 120. If the ink reserve is normal, the ink pump 130 is not activated. If the ink reserve is too low, the ink pump 130 is activated to replenish the ink in the ink tank 120.

The ink tank 120 further includes a pressure sensor 123, which is disposed on the first pipeline 141, is connected to the ink tank 120 through the first pipeline 141, and is used to detect a gas pressure value between the ink tank 120 and the printer head 170. When the gas pressure value of the ink tank 120 reaches the default value, bubbles or the ink in the printer head 170 have been removed and the printer head 170 is released from a clogged state.

Further, the ink tank 120 and the ink cartridge 110 are made of metal materials (such as aluminum and stainless steel), which are suitable for resisting acid and alkali of the ink 200. The output pipeline 111, the ink pipeline 131, the return pipeline 161, and the first pipeline 141 are made of teflon. Since the teflon has excellent high-low temperature resistance and chemical stability, the teflon does not generate chemical reactions with the ink 200 when the ink 200 flows in the output pipeline 111, the ink pipeline 131, the return pipeline 161, and the first pipeline 141. Furthermore, the ink cartridge 110, the ink tank 120, the output pipeline 111, the ink pipeline 131, the return pipeline 161, and the first pipeline 141 are all made of opaque materials to prevent the ink 200 from being deteriorated by irradiation of an external light source.

Figure 2A:
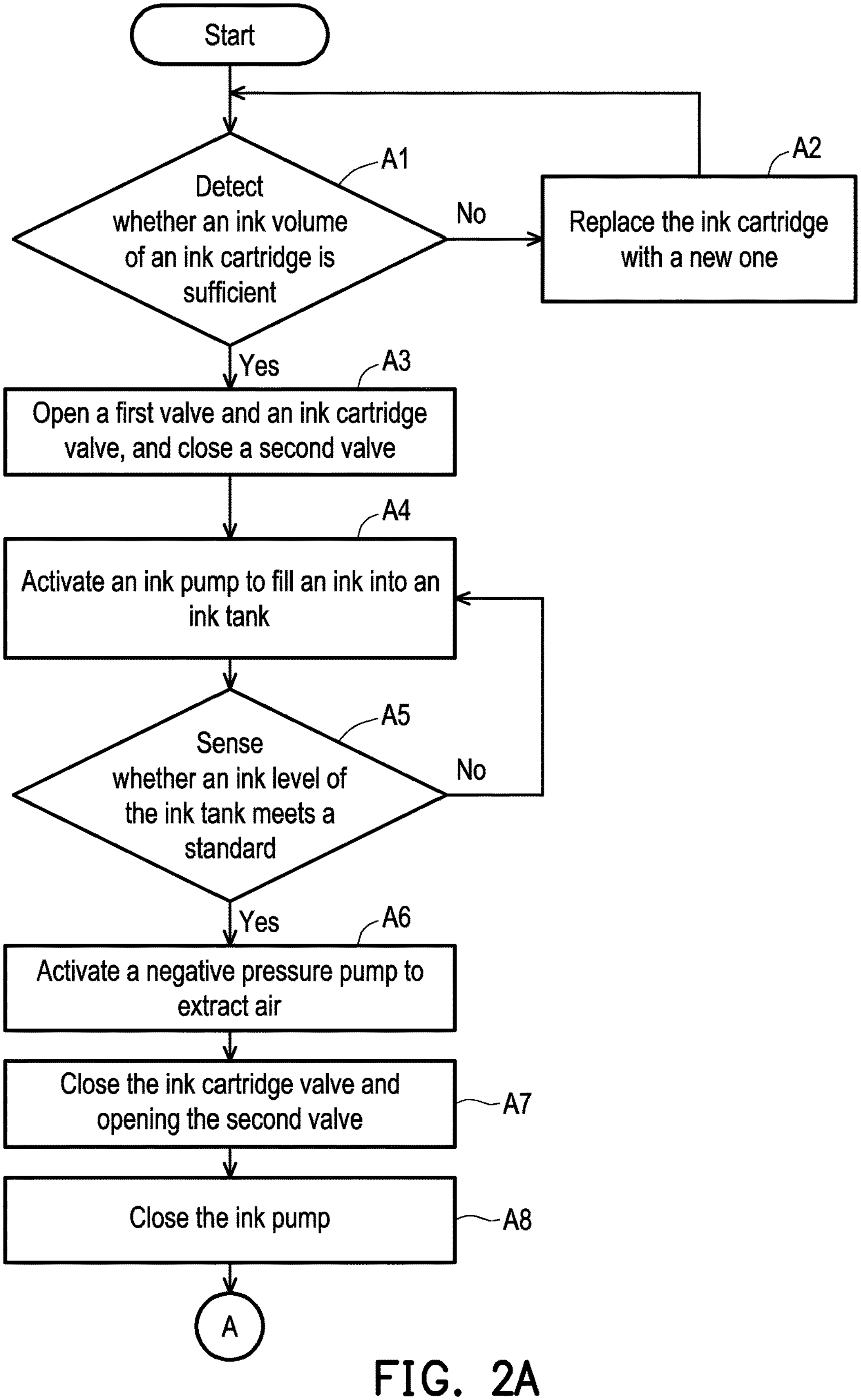
FIGS. 2A and 2B are action flow charts of the ink circulation system of FIG. 1 in a ink filling mode.
Figure 2B:
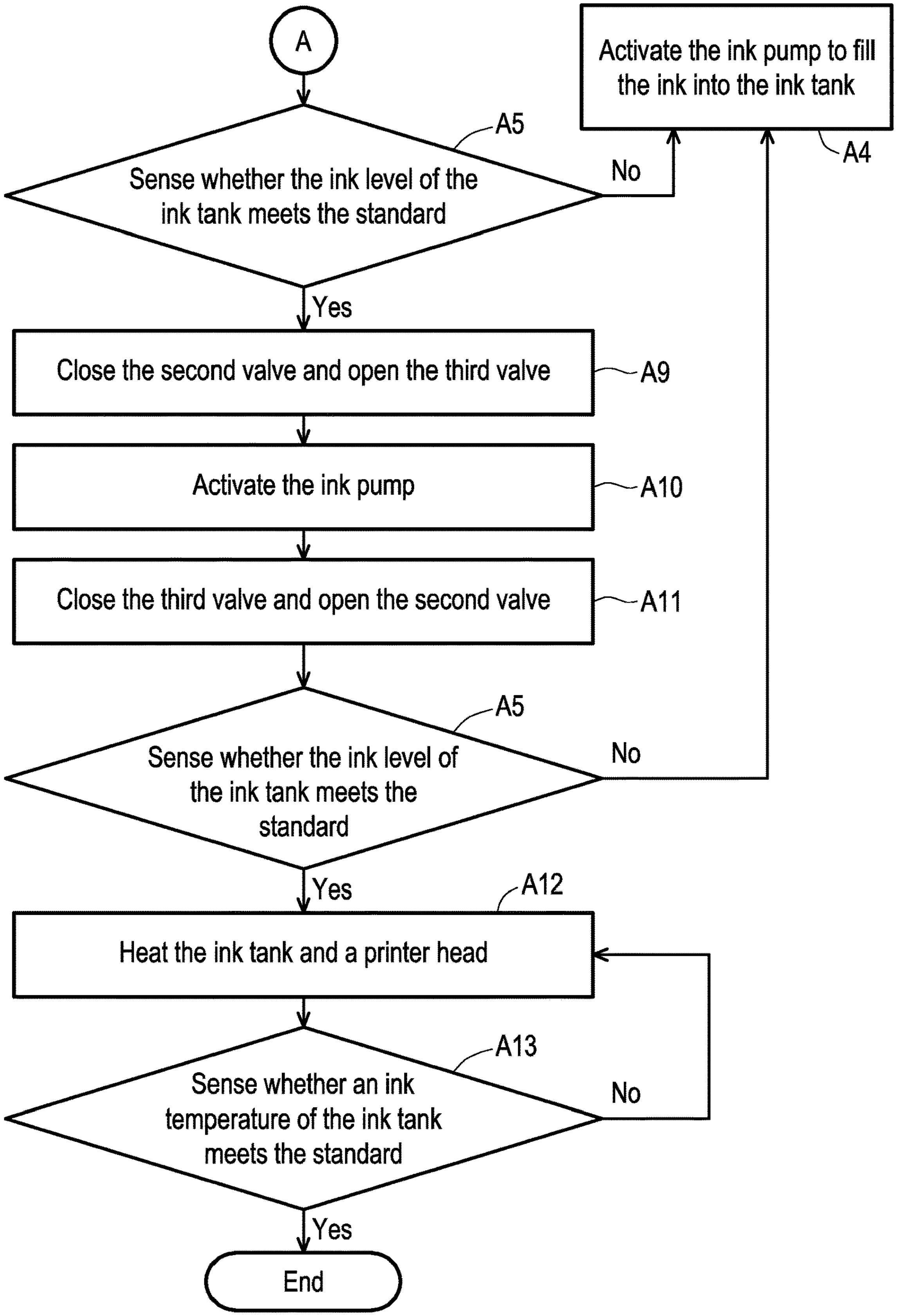

Referring to FIG. 1, FIG. 2A, and FIG. 2B, when the ink circulation system 100 is in the ink filling mode, the purpose is to fill the ink 200 in the ink cartridge into the ink tank 120 and a corresponding pipeline. The weight sensor 113 is used to detect whether the ink volume of the ink cartridge 110 is sufficient (Step A1). If the weight of the ink cartridge 110 is lower than the default value, a notification is issued to replace the ink cartridge 110 with a new one (Step A2). If the weight of the ink cartridge 110 is higher than the default value, the first valve 140 and the ink cartridge valve 112 are opened and the second valve 150 is closed (Step A3). The ink pump 130 is activated to fill the ink 200 into the ink tank 120 along the output pipeline 111 and the ink pipeline 131 (Step A4). Multiple level sensors 122 are used to sense whether the ink level of the ink tank 120 meets a standard (Step A5). If a sensing result is negative, Step A4 is re-executed. If the sensing result is positive, the gas pressure valve 194 switches the first pipeline 141 to be connected to the negative pressure pump 193 and activates the negative pressure pump 193 to provide the negative pressure to the ink tank 120 (Step A6), so that the ink tank 120, the first pipeline 141, and the gas pressure pipeline 191 form the vacuum. Next, the ink cartridge valve 112 is closed and the second valve 150 is opened (Step A7), so that the ink 200 circulates among the ink tank 120, the output pipeline 111, and the ink pipeline 131. Then, the ink pump is closed (Step A8) to stop the fluidity of the ink 200.

Then, Step A5 is repeated to sense whether the ink level of the ink tank meets the standard. If the sensing result is negative, the ink pump 130 is activated to fill the ink 200 into the ink tank 120. If the sensing result is positive, the second valve 150 is closed and the third valve 160 is opened (Step A9) and the ink pump 130 is activated (Step A10), so that the ink 200 circulates among the ink tank 120, the return pipeline 161, and the ink pipeline 131, and the ink 200 passes through the printer head 170. Further, the third valve 160 is closed and the second valve 150 is opened (Step A11), and Step A5 is repeated again to sense whether the ink level of the ink tank meets the standard. If the sensing result is negative, the ink pump 130 is activated to fill the ink 200 into the ink tank 120. If the sensing result is positive, the heating assembly 180 is activated to heat the ink 200 in the ink tank 120 and the printer head 170 (Step A12). Then, whether an ink temperature in the ink tank 120 and the printer head 170 meets the standard is sensed. If the sensing result is negative, Step A12 is executed again until the ink temperature meets the standard. If the sensing result is positive, the ink circulation system 100 has completed ink filling and finishes the operation.

Figure 3A:
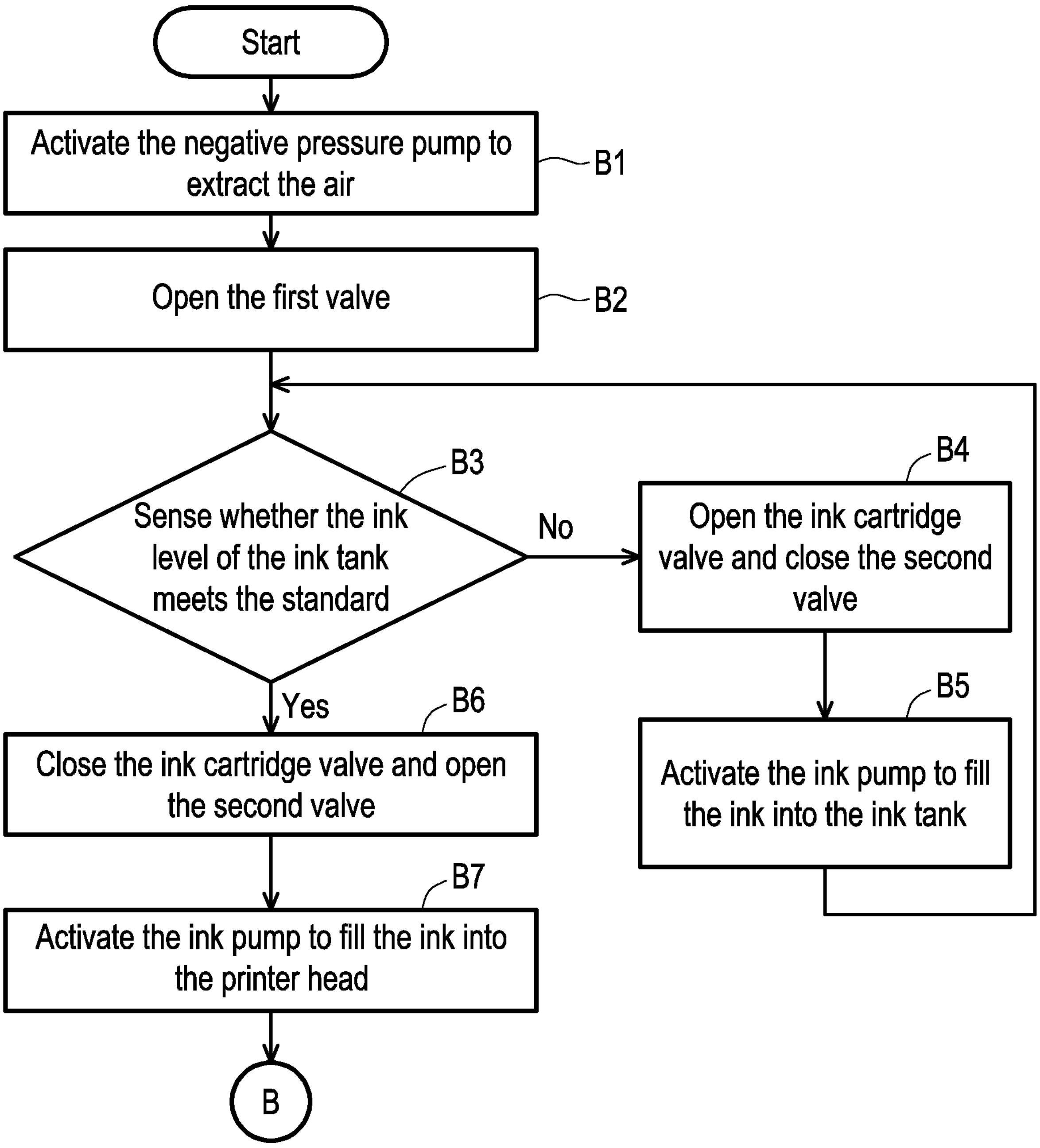
FIGS. 3A and 3B are action flow charts of the ink circulation system of FIG. 1 in a loop printing mode.
Figure 3B:
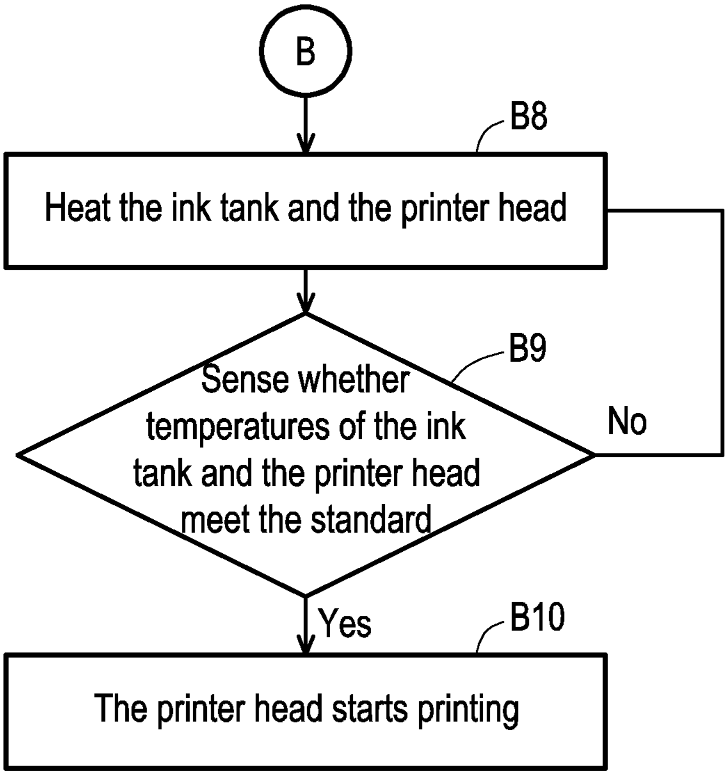

Referring to FIG. 1, FIG. 3A, and FIG. 3B. When the ink circulation system 100 is in the loop printing mode, the purpose is to ensure whether the ink 200 in the ink tank 120 is sufficient before printing, and maintain the fluidity of the ink 200, so that the printer head 170 may print smoothly. First of all, the gas pressure valve 194 switches the first pipeline 141 to be connected to the negative pressure pump 193 and activates the negative pressure pump 193 (Step B1). Then, the first valve 140 is opened (Step B2) to provide the negative pressure to the ink tank 120, so that the ink tank 120, the first pipeline 141, and the gas pressure pipeline 191 form the vacuum. Multiple level sensors 122 are used to sense whether the ink level of the ink tank 120 meets the standard (Step B3). If the sensing result is negative, the ink cartridge valve 112 is opened and the second valve 150 is closed (Step B4), and the ink pump 130 is activated to fill the ink 200 into the ink tank 120 along the output pipeline 111 and the ink pipeline 131 (Step B5). If the sensing result is positive, the ink cartridge valve 112 is closed and the second valve 150 is opened (Step B6). Then, the ink pump 130 is activated to fill the ink 200 into the printer head 170 (Step B7), and the heating assembly 180 is activated to heat the ink 200 in the ink tank 120 and the printer head 170 (Step B8). Next, whether the ink temperature in the ink tank 120 and the printer head 170 meets the standard is sensed (Step B9). If the sensing result is negative, Step B8 is executed again until the ink temperature meets the standard. If the sensing result is positive, the printer head 170 starts printing and outputting the ink 200 (Step B10).

Figure 4A:
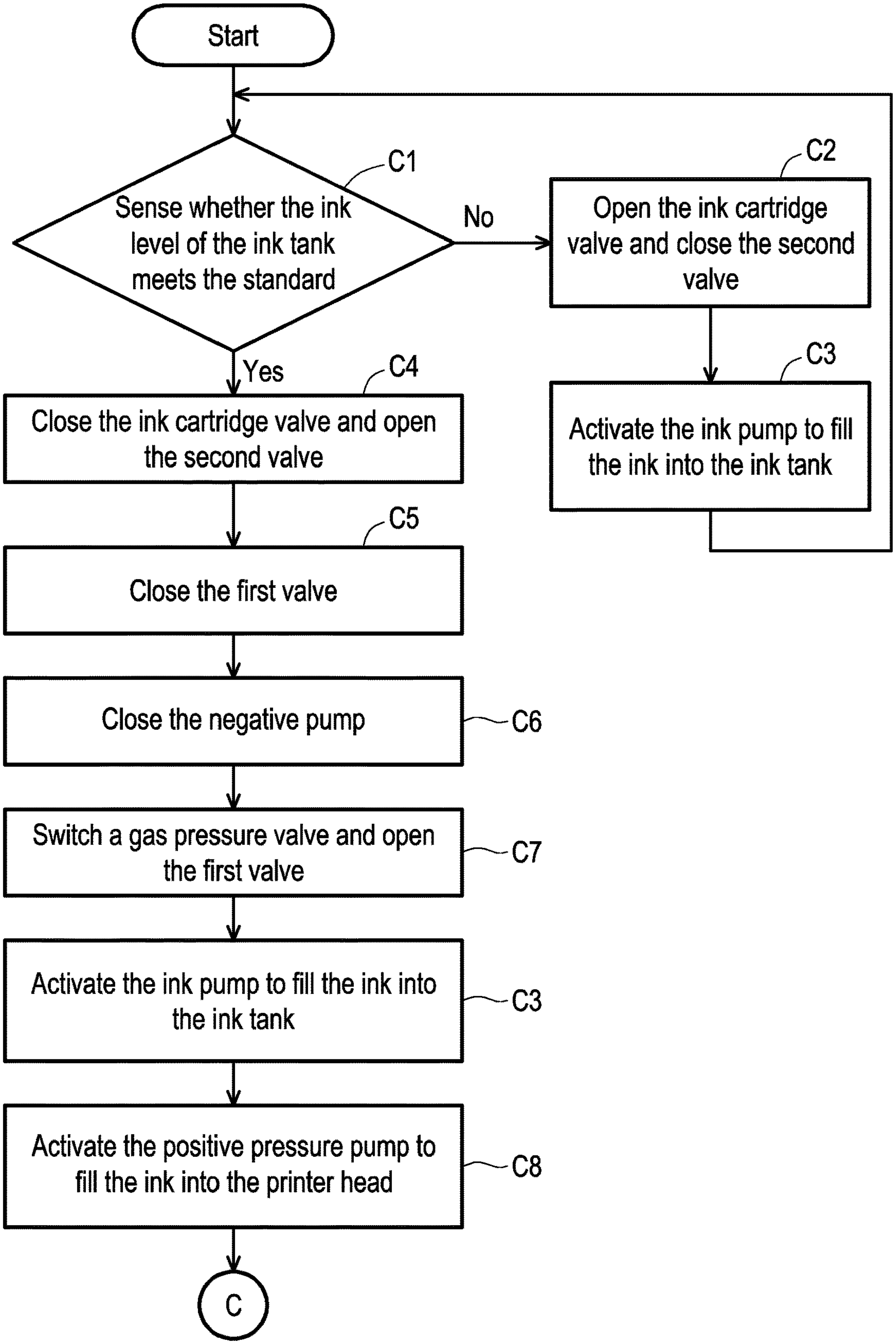
FIGS. 4A and 4B are action flow charts of the ink circulation system of FIG. 1 in a ink removal mode.
Figure 4B:
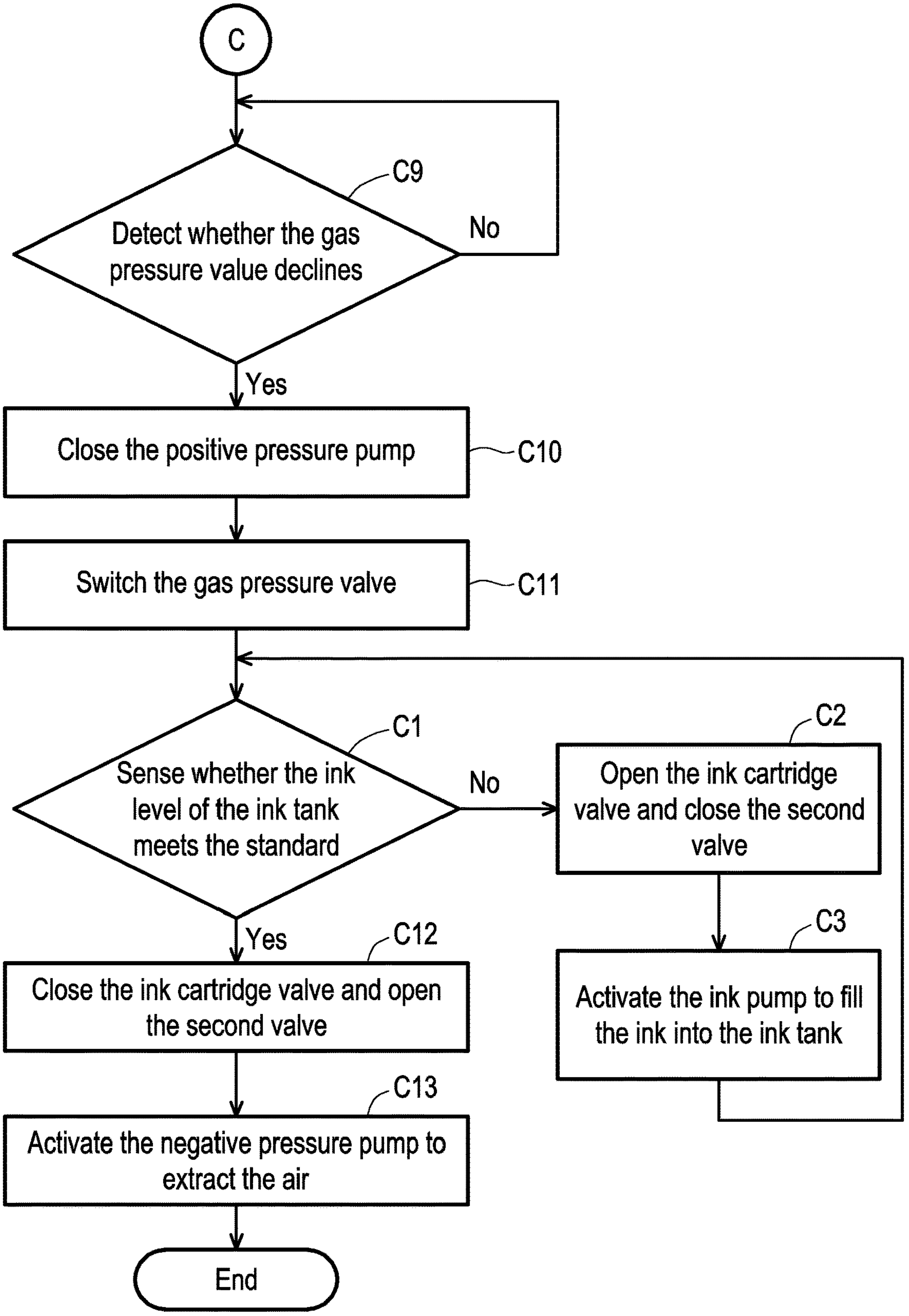

Referring to FIG. 1, FIG. 4A, and FIG. 4B, when the ink circulation system 100 is in the ink removal mode, the purpose is to remove the printer head 170 clogged by the ink. Multiple level sensors 122 are used to sense whether the ink level of the ink tank 120 meets the standard (Step C1). If the sensing result is negative, the ink cartridge valve 112 is opened and the second valve 150 is closed (Step C2), and the ink pump 130 is activated to fill the ink 200 into the ink tank 120 along the output pipeline 111 and the ink pipeline 131 (Step C3). If the sensing result is positive, the ink cartridge valve 112 is closed and the second valve 150 is opened (Step C4). Then, the first valve 140 is closed (Step C5) and the negative pressure pump 193 is closed (Step C6) to stop providing the negative pressure. Next, the gas pressure valve 194 switches the first pipeline 141 to be connected to the positive pressure pump 192 and opens the first valve 140 (Step C7), and the ink pump 130 is activated to fill the ink 200 into the ink tank 120 along the output pipeline 111 and the ink pipeline 131 (Step C3). The positive pressure pump 192 is activated to extract the air 300 from the outside and transmit the air 300 from the gas pressure pipeline 191 and the first pipeline 141 to the ink tank 120, thereby squeezing the ink 200 in the ink tank 120, so that the ink 200 is transmitted to the printer head 170 through the ink tank pipeline 121 (Step C8) to remove the ink 200 clogged in the printer head 170.

Next, the pressure sensor 123 is used to detect whether the gas pressure value between the ink tank 120 and the printer head 170 declines to the default value (Step C9). If the sensing result is negative, Step C8 is repeated. If the sensing result is positive, the ink 200 in the printer head 170 has been removed and the printer head 170 is released from the clogged state. Then, the positive pressure pump 192 is closed (Step C10) and the gas pressure valve 194 switches the first pipeline 141 to be connected to the negative pressure pump 193 (Step C11). Step C1 is repeated again, if the sensing result is negative, the ink cartridge valve 112 is opened and the second valve 150 is closed (Step C2), and the ink pump 130 is activated to fill the ink 200 into the ink tank 120 along the output pipeline 111 and the ink pipeline 131 (Step C3). If the sensing result is positive, the ink cartridge valve 112 is closed and the second valve 150 is opened (Step C12). Finally, the negative pressure pump 193 is activated to provide the negative pressure to the ink tank 120 to extract the air (Step C13), so that the ink tank 120, the first pipeline 141, and the gas pressure pipeline 191 form the vacuum to prevent the ink 200 from leaking from the printer head 170.

In short, when the ink 200 dries out and becomes clogged in the printer head 170, the ink removal mode may be used to provide the positive pressure, so that the ink 200 with fluidity is transmitted to the printer head 170 to remove the dried ink 200, thereby maintaining the smooth flow of the printer head 170.

Figure 5A:
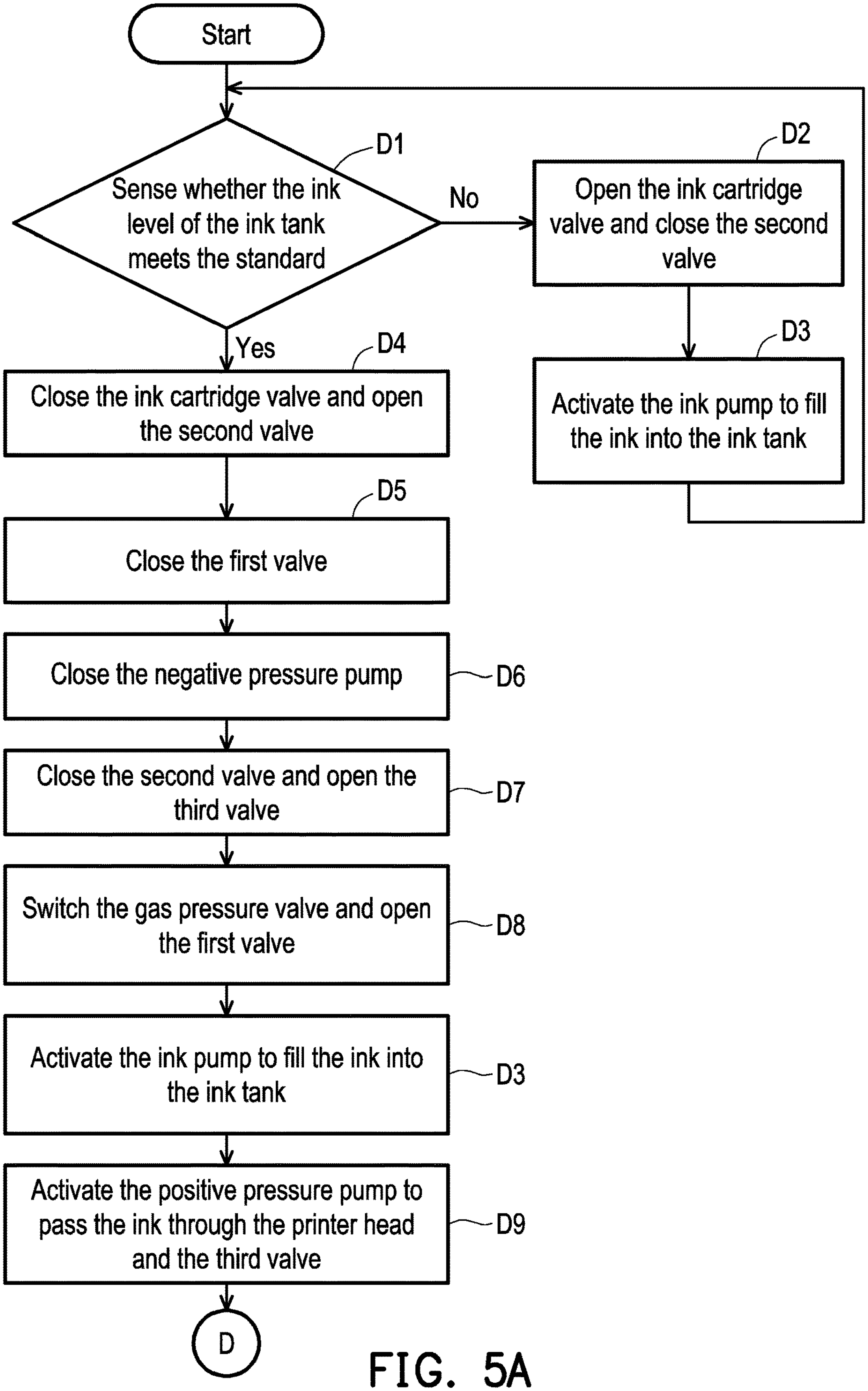
FIGS. 5A and 5B are action flow charts of the ink circulation system of FIG. 1 in a bubble removal mode.
Figure 5B:
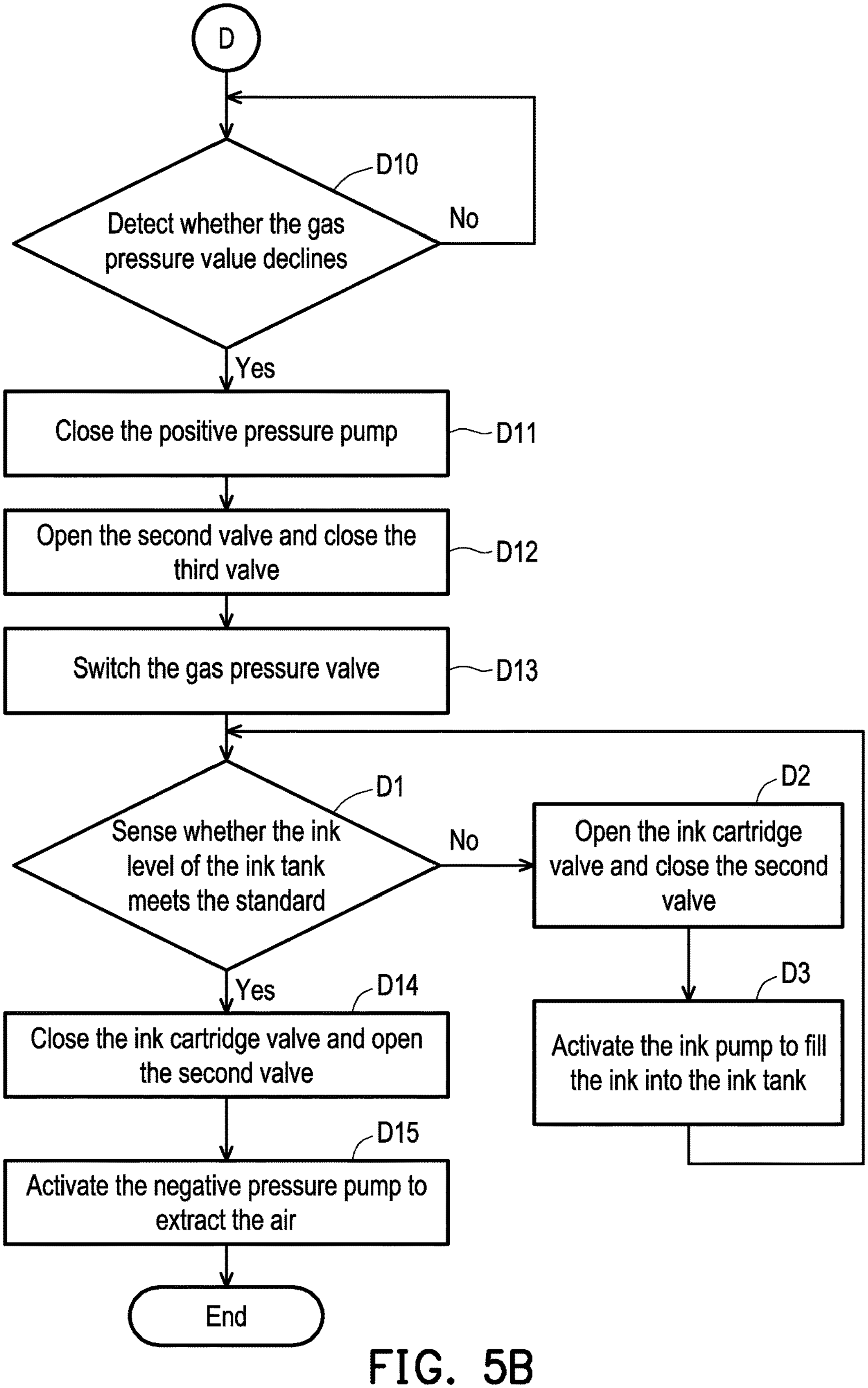

Referring to FIG. 1, FIG. 5A, and FIG. 5B, when the ink circulation system 100 is in the bubble removal mode, the purpose is to remove the bubbles from the printer head 170. Multiple level sensors 122 are used to sense whether the ink level of the ink tank 120 meets the standard (Step DD. If the sensing result is negative, the ink cartridge valve 112 is opened and the second valve 150 is closed (Step D2), and the ink pump 130 is activated to fill the ink 200 into the ink tank 120 along the output pipeline 111 and the ink pipeline 131 (Step D3). If the sensing result is positive, the ink cartridge valve 112 is closed and the second valve 150 is opened (Step D4). Then, the first valve 140 is closed (Step D5) and the negative pressure pump 193 is closed (Step D6) to stop providing the negative pressure. The second valve 150 is closed and the third valve 160 is opened (Step D7). Next, the gas pressure valve 194 switches the first pipeline 141 to be connected to the positive pressure pump 192 and opens the first valve 140 (Step D8), and the ink pump 130 is activated to fill the ink 200 into the ink tank 120 along the output pipeline 111 and the ink pipeline 131 (Step D3). The positive pressure pump 192 is activated to extract the air 300 from the outside and transmit the air 300 from the gas pressure pipeline 191 and the first pipeline 141 to the ink tank 120, thereby squeezing the ink 200 in the ink tank 120, so that the ink 200 passes through the printer head 170 and the third valve 160 (Step D9), and the ink 200 circularly flows in the return pipeline 161, the ink pipeline 131, and the ink tank pipeline 121 to remove the bubbles from the printer head 170.

Then, the pressure sensor 123 is used to detect whether the gas pressure value between the ink tank 120 and the printer head 170 declines to the default value (Step D10). If the sensing result is negative, Step D9 is repeated. If the sensing result is positive, the bubbles in the printer head 170 have been removed. Then, the positive pressure pump 192 is closed (Step D11). The second valve 150 is opened and the third valve 160 is closed (Step D12), and the gas pressure valve 194 switches the first pipeline 141 to be connected to the negative pressure pump 193 (Step D13). Step D1 is repeated again, if the sensing result is negative, the ink cartridge valve 112 is opened and the second valve 150 is closed (Step D2), and the ink pump 130 is activated to fill the ink 200 into the ink tank 120 along the output pipeline 111 and the ink pipeline 131 (Step D3). If the sensing result is positive, the ink cartridge valve 112 is closed and the second valve 150 is opened (Step D14). Finally, the negative pressure pump 193 is activated to provide the negative pressure to the ink tank 120 to extract the air (Step D15), so that the ink tank 120, the first pipeline 141, and the gas pressure pipeline 191 form the vacuum to prevent the ink 200 from leaking from the printer head 170.

In short, when the ink 200 contains the bubbles and enters the printer head 170, the bubble removal mode may be used to provide the positive pressure, so that the ink 200 circularly flows and passes through the printer head 170 to remove the bubbles from the printer head 170 and the ink 200.

Based on the above, the ink pump of the ink circulation system of the invention is used to extract the ink from the ink cartridge and fill the ink into the ink tank along the output pipeline and the ink pipeline to achieve the purpose of replenishing the ink. Further, the negative pressure may be provided to the ink tank through the positive-negative pressure assembly to absorb the ink in the ink tank, thereby preventing the ink from leaking from the printer head. The positive-negative pressure assembly is suitable for providing the positive pressure to the ink tank to squeeze the ink in the ink tank, so that the ink is transmitted to the printer head to release the printer head from the clogged situation or remove the bubbles from the printer head by enabling the ink to pass through the printer head and the third valve. In addition, the heating assembly of the invention is suitable for heating the ink in the ink tank and the printer head to reduce the viscosity of the ink, thereby improving the fluidity of the ink and reducing the clogging of the printer head by the ink.

What is claimed is:

1. An ink circulation system, comprising:

an ink cartridge, having an output pipeline and an ink cartridge valve, wherein the ink cartridge valve is disposed on the output pipeline;

an ink tank, disposed on one side of the ink cartridge and connected to the output pipeline of the ink cartridge;

an ink pump, connected to the output pipeline and the ink tank through an ink pipeline;

a first valve, connected to the ink tank through a first pipeline;

a second valve, disposed on the output pipeline;
a third valve, connected to the output pipeline and the ink pipeline through a return pipeline;
a printer head, connected to the ink tank and the return pipeline;
a heating assembly, disposed in the ink tank; and
a positive-negative pressure assembly, connected to the first pipeline through a gas pressure pipeline,
wherein the ink pump is used to extract ink from the ink cartridge and fill the ink into the ink tank along the output pipeline and the ink pipeline, and the positive-negative pressure assembly provides a positive pressure or a negative pressure to the ink tank to squeeze or absorb the ink in the ink tank,
wherein the positive-negative pressure assembly has a positive pressure pump, a negative pressure pump, and a gas pressure valve, the positive pressure pump and the negative pressure pump are respectively connected to the gas pressure pipeline, the gas pressure valve is disposed between the gas pressure pipeline and the first pipeline, and the gas pressure valve is used to switch the first pipeline to be connected to the positive pressure pump or the negative pressure pump.

2. The ink circulation system of claim 1, wherein when the ink circulation system is in a ink filling mode, an ink volume of the ink cartridge is detected, the first valve and the ink cartridge valve are opened and the second valve is closed, the ink pump is activated to fill the ink into the ink tank along the output pipeline and the ink pipeline, the positive-negative pressure assembly provides the negative pressure to the ink tank, and closes the ink cartridge valve and opens the second valve, the ink pump is then closed, and after sensing that an ink level of the ink tank meets a standard, the heating assembly is activated to heat the ink in the ink tank and the printer head.

3. The ink circulation system of claim 1, wherein when the ink circulation system is in a loop printing mode, the positive-negative pressure assembly is activated and the negative pressure is provided, the first valve is opened, and after sensing that an ink level of the ink tank meets a standard, the ink cartridge valve is closed and the second valve is opened, the ink pump is activated to fill the ink into the printer head, the heating assembly heats the ink in the ink tank and the printer head, and the printer head starts printing.

4. The ink circulation system of claim 1, wherein when the ink circulation system is in an ink removal mode, after sensing that an ink level of the ink tank meets a standard, the ink cartridge valve and the first valve are closed and the second valve is opened, the positive-negative pressure assembly stops providing the negative pressure and opens the first valve, the ink pump is activated to fill the ink into the ink tank along the output pipeline and the ink pipeline, the positive-negative pressure assembly provides the positive pressure to the ink tank to squeeze the ink to be transmitted to the printer head.

5. The ink circulation system of claim 4, further comprising a pressure sensor disposed on the first pipeline and used to detect a gas pressure value between the ink tank and the printer head.

6. The ink circulation system of claim 5, wherein when the gas pressure value of the ink tank declines to a default value, the printer head is released from a clogged state.

7. The ink circulation system of claim 1, wherein when the ink circulation system is in a bubble removal mode, after sensing that an ink level of the ink tank meets a standard, the ink cartridge valve and the first valve are closed and the second valve is opened, after the positive-negative pressure assembly stops providing the negative pressure, the first valve and the third valve are opened and the second valve is closed, the ink pump is activated to fill the ink into the ink tank along the output pipeline and the ink pipeline, and the positive-negative pressure assembly provides the positive pressure to the ink tank to squeeze the ink to pass through the printer head and the third valve.

8. The ink circulation system of claim 7, further comprising a pressure sensor disposed on the first pipeline and used to detect a gas pressure value between the ink tank and the printer head.

9. The ink circulation system of claim 8, wherein when the gas pressure value of the ink tank declines to a default value, the printer head is released from a clogged state.

10. The ink circulation system of claim 1, wherein the ink tank further has a plurality of level sensors disposed on an outer surface of the ink tank and used to detect an ink level in the ink tank.

11. The ink circulation system of claim 1, further comprising a weight sensor disposed at a bottom of the ink cartridge and used to detect an ink volume of the ink cartridge.

12. The ink circulation system of claim 1, wherein the ink tank and the ink cartridge are made of metal materials.

13. The ink circulation system of claim 1, wherein the output pipeline, the ink pipeline, the return pipeline, and the first pipeline are made of teflon.

* * * * *